April 19, 1932. A. C. PETERSON Re. 18,429

FUEL INJECTION ENGINE

Original Filed Feb. 21, 1923 2 Sheets-Sheet 1

Inventor:
Adolphe C. Peterson,
By Chindahl, Parker & Carlson
Attys

April 19, 1932. A. C. PETERSON Re. 18,429

FUEL INJECTION ENGINE

Original Filed Feb. 21, 1923 2 Sheets-Sheet 2

Inventor:
Adolphe C. Peterson,
By Chindahl, Parker & Carlson
Attys.

Reissued Apr. 19, 1932 Re. 18,429

UNITED STATES PATENT OFFICE

ADOLPHE C. PETERSON, OF WASHINGTON, DISTRICT OF COLUMBIA, ASSIGNOR BY MESNE ASSIGNMENTS, TO EX-CELL-O AIRCRAFT & TOOL CORPORATION, OF DETROIT, MICHIGAN, A CORPORATION OF MICHIGAN

FUEL INJECTION ENGINE

Original No. 1,691,302, dated November 13, 1928, Serial No. 620,529, filed February 21, 1923. Application for reissue filed January 12, 1931. Serial No. 508,272.

My invention relates to internal combustion engines and particularly to an improved system employing injection wherefore it is called a fuel injection engine.

The principal objects of my invention are to provide an engine which will have the advantages of the injection engine and will embody such advantages without certain of the disadvantages usually found in such injection systems and which will have increased efficiency in the combustion of the fuel and which will be better adapted to more varied engine uses and particularly to the smaller cylinder types while it will also be adapted to the larger power types providing the same advantages of construction, operation and efficiency in both the smaller and larger types. In general the object is to provide an improved injected fuel engine having increased efficiency and utilization.

The principal devices and combinations of devices comprising my invention are as hereinafter described and defined in the claims.

In the accompanying drawings which illustrate my invention, like characters refer to like parts throughout the several views.

Referring to the drawings.

Figure 1:
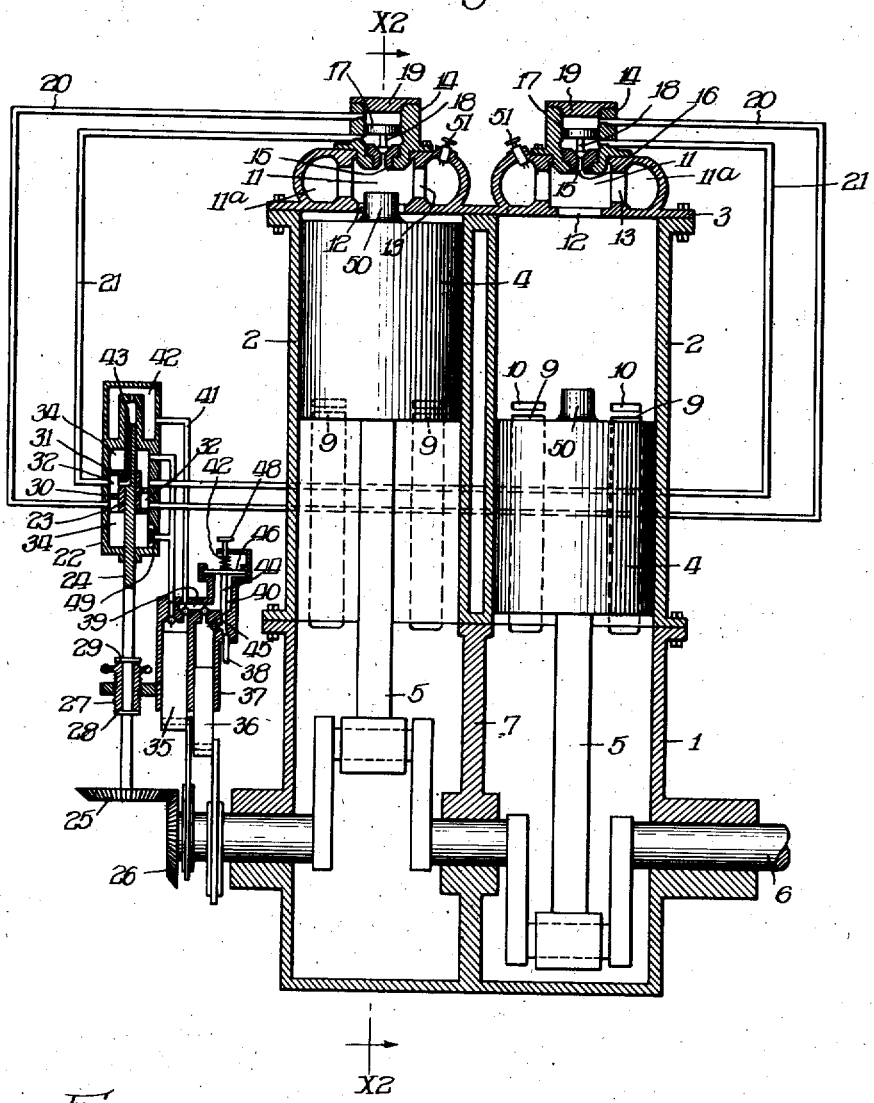
Figure 1 is a view chiefly in vertical cross section on the line $X^1$—$X^1$ of Figure 2, some parts being shown in full side elevation and some parts being broken away.
Figure 3:
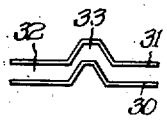
Figure 3 is a view in protraction of the face of the distributor shown in Figures 1 and 2.
Figure 2:
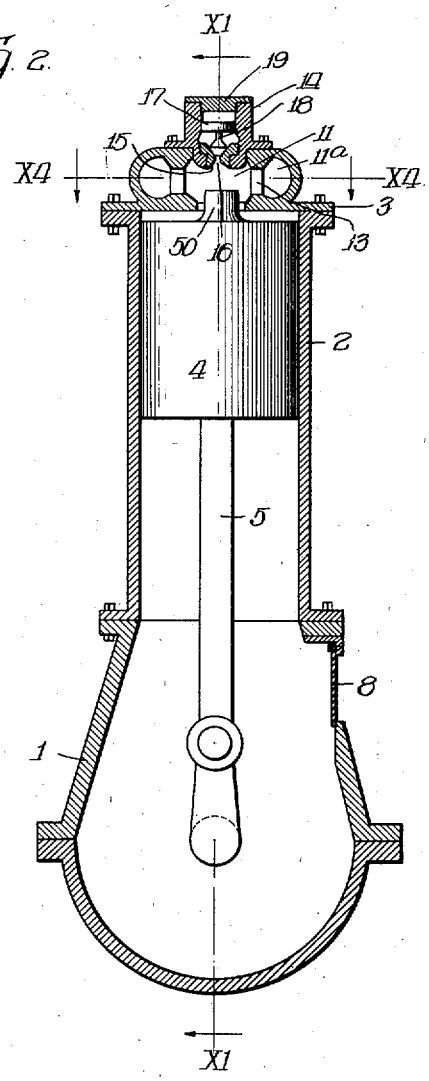
Figure 2 is a view in vertical cross section at right angles to that of Figure 1, this view being on the line $X^2$—$X^2$ of Figure 1, some parts being broken away and some parts being shown in full side elevation.
Figure 4:
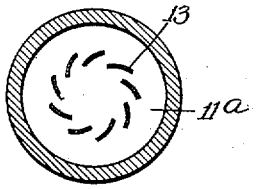
Figure 4 is a section on line 4—4 of Figure 2.

Referring to the drawings, the numeral 1 indicates a crank case whereon is mounted a cylinder casting having cylinders 2 upon which is secured a head casting 3. The cylinder casting has cooperating pistons 4 in each cylinder each piston being connected by a rod 5 with the related crank of a crank shaft 6 rotatably mounted in bearings in the crank case. The crank case 1 has a central wall 7 dividing the crank case into compartments related to each cylinder and each compartment has related a port controlled by an automatic flap valve 8 whereby atmospheric air may freely enter the related crank compartment during ascending strokes of the related piston and the air is prevented from return to the atmosphere. Each crank compartment has related air ports delivering through related passages in the cylinder casting each to inlet ports 9 in the side wall of the related cylinder the inlet ports being at such a height in the cylinder wall that the inlet ports are just uncovered at the lower extreme limit of stroke of the related piston. Each cylinder has also exhaust ports 10 located in the side walls of the cylinder immediately above the inlet ports 9 whereby these exhaust ports are uncovered just before the piston uncovers the inlet ports and these exhaust ports have free delivery to the atmosphere.

The cylinder head casting 3 has formed with it integrally one for each cylinder combustion chambers 11 which severally have a circular and somewhat annular form and have each an opening or port 12 providing relatively free communication with the cylinder bore related. Each of the combustion chambers 11 have vertical vanes 13 located in a circle about the axial center of the combustion chamber these vanes being of such a shape and all having such a uniformly extending direction related to the circular position of the set that they will collectively induce circular movement or rotation in the extreme annular portion of the combustion chamber of any gases passing from the central portion of the combustion chamber radially outward to the outward portions of the combustion chamber. Each combustion chamber has attached to its upper face or upper wall in its exact center a nozzle cylinder body 14 which has inserted in its lower end a nozzle 15 adapted to deliver through a fine central aperture 16 to the center of the related combustion chamber and which has also reciprocably mounted within it to be adapted to reciprocate vertically a needle piston 17 which bears at its lower side a related nozzle needle 18. The nozzle cylinder body 14 is closed at its upper end by a cap 19. Each nozzle cylinder body 14 has delivery or communication from its interior bore by two conduits one 20 having communication with the portion of the bore above the needle piston 17 and one 21 having communication with the portion of the bore below the needle piston 17. The conduits 20 and 21 of all the nozzle cylinder bodies 14 communicate at their other ends individually with the interior of a distributor casing 22 or the isolated spaces therein as hereinafter described and as controlled by a rotatable distributor 23 which is rotated through its axle rod 24 and gears 25—26 by the crank shaft 6 at a speed the same as that of the crank shaft, and is movable vertically in the direction of its axis by means of manually controlled screwable sleeve 27 providing location axially of the axle rod 24 by means of the collars 28—29. A slidable axial spline connection (not shown since the details per se form no part of the present invention) is provided between the rod 24 on which the sleeve 27 is rotatably anchored and the shaft to which the gear 25 is secured so as to permit the aforesaid independent vertical adjustment of the rod 24 through adjustment of the sleeve 27. The rotatable distributor 23 has two radial walls 30 and 31 extending around it whereby a channel 32 is formed about the distributor and this channel has at one portion of its circumference an upwardly extended swing 33 formed by an angle in each of the walls 30—31, so that, the distributor being properly placed by the manual control sleeve, the upper conduits 20 will have communication during substantially the greatest part of the revolution of the distributor with the interior channel 32 and during the remaining lesser portion with the remaining space 34 of the interior of the distributor casing 22 and so that at corresponding portions of the revolution the lower conduits 21 will have communication during substantially the greatest portion of the revolution with the space 34 and during the lesser portion of the revolution with the interior channel 32. The conduits 20 and 21 related to one cylinder have their communication at the lesser periods simultaneously so that the inversion of the communication is simultaneous as to one cylinder and the communication is reversed as to the conduits of one cylinder at such timed periods relative to the crank shaft movement that the reversal occurs in or as to each cylinder at the time when the related piston is passing through its extreme upper stroke, and the timed periods of the reversal movement may occur as to each cylinder during a period determined as to its relative length by the relative vertical location of the distributor by the manual control sleeve 27.

Since the upper portion of each nozzle cylinder bore is normally connected with the interior channel 32 which as hereinafter described is the high pressure side of the fuel system and the lower portion of the nozzle cylinder bore is normally connected with the lower pressure side of the fuel system, the needle pistons in each nozzle cylinder bore will normally be closely depressed with the related needle against the seat in the nozzle but at the reversal periods as to each cylinder the pressures in the related nozzle cylinder bore will be reversed and the needle piston with its needle then quickly moved upward whereby the aperture 16 related will be uncovered and fuel released from the nozzle cylinder bore at the lower side into the related cylinder. The pressures at the moment of reversal in each nozzle cylinder bore at the lower side of the needle piston will be that of the high pressure side of the system and this will be uniformly sustained by a pair of fuel pumps 35 and 36, operated by the crank shaft and reciprocating in a pump casing 37 the pump 35 being adapted to pump fuel from the space 34 of the distributor casing and the fuel pump 36 being adapted to pump fuel from a supply conduit 38, each of the pumps delivering into a channel 39 which has communication with a diaphragm casing bore 40 and has also communication through conduits and passages 41—42—43 with the interior channel 32 whereby fuel pumped from the space 34 and fuel pumped from the supply conduit 38 are continuously delivered to the interior channel 32, the pressure of delivery of the fuel being however controlled by a needle valve 44 normally held seated against a by-pass 45 by-passing the fuel back to the supply conduit 38 by a diaphragm 46 and spring 47 which is regulable by a manual screw 48. The distributor casing has in its side wall a by-pass 49 whereby the interior channel 32 will be by-passed to the space 34 for neutral or inactive operation when the distributor is moved to its lowermost position by the manual control sleeve.

Each piston 4 has upon its upper piston head an attached or integrally constructed deflector extension 50 whereby the air from the inlet ports will at its entry be deflected upward.

Each combustion chamber 11 has inserted in its wall a spark plug or other ignition device 51 whereby electrical ignition for starting or otherwise as desired may be provided.

In the operation of my engine the engine crank shaft is given its initial revolution by any of the means commonly employed for such purpose and after such initial revolution takes up its regular cycle each cylinder having an induction of fresh air from the related crank chamber as compressed therein in the commonly used two cycle form at the moment of uncovering of the inlet ports and the inducted air charge is then compressed in the cylinder and the distributor at the period of approximately maximum compression in the cylinder reverses the fuel pressures in the related conduits 20—21 whereby the needle piston related is lifted and the fuel released from the fuel pressure system into the combustion chamber 11, the fuel being by the high pressure sprayed in a fine spray into the central portion of the combustion chamber 11 and from thence carried by the entering air under compression from the cylinder bore into the annular portion of the combustion chamber 11[a] and directed in such movement in a uniformly directed rotational movement about the annular portion whereby great turbulence and admixture of the fuel charge with the air charge and a hastened combustion is secured. The fuel injection is for this purpose preferably timed to take place a trifle before the maximum compression and may extend through this maximum compression period as determined by the construction. It is to be noted that means may be provided for the altering of this timed injection manually as may be necessary in a greatly variable speed of rotation of the crank shaft. Upon combustion of the charge the reversal of movement of the gases in the combustion chamber 11 will again cause by their passage through the vane spaces a renewed turbulence in the passage inwardly and to the cylinder bore through the port 12 thereby promoting completion of the fuel combustion. By the distributor action each needle piston is thus lifted at the proper period for injection as to its cylinder and the injection to each cylinder will occur from a uniformly maintained pressure supply of fuel thus providing uniform injection to each cylinder.

While I have shown a particular form of distributing means for the fuel system or reversal means, and a particular pump means I contemplate that any form of such distributor means may be employed and that any form of means maintaining the high pressure side of the system at a somewhat higher pressure than the lower pressure side may be used and that any means for providing a supply of fuel under pressure to the system may be used and sustaining the pressure at a substantially uniform degree and that any form of controlling the pressure may be used and any form of varying the length of the reversal period may be employed. The pump system and distributor may be constructed in an integral body for simplicity of construction. It is to be noted that the fuel pressure on the high pressure side would preferably be maintained at say a pressure of some eight hundred or a thousand or more pounds and that the pressure on the low pressure side would preferably be maintained at a pressure only a comparatively few pounds less say a hundred or less pounds under that of the higher pressure side whereby less tendency to leakage between the pressure sides would occur, although it is to be noted that such leakage is not an important factor in the operation as the fuel injection pressures are uniform, the pressure difference between the sides being essentially only such that the necessary prompt or immediate action of the needle pistons is secured.

While I have shown particular detailed means and combinations in the illustration of my invention I contemplate that any detailed means or combinations may be used in the realization of my invention without departing from the spirit and intention thereof.

It is to be noted here that each set of conduits comprising an upper high pressure and the lower pressure conduit may control one or more nozzles as where there may be used several nozzles to one large cylinder or where several cylinders are timed to have combustion simultaneously.

What I claim is:

1. The combination with a multiple cylinder internal combustion engine, of a valve actuating apparatus comprising a common rotary fluid distributor and a plurality of valve pistons in valve piston casings each communicating with said distributor, means whereby the fluid distributor may cause reversal of pressures on the opposite sides of the valve pistons periodically, and means whereby the reversal of a piston causes a change in the release of fluid to a related cylinder chamber.

2. A valve actuating apparatus comprising a plurality of valve pistons in valve piston casings, a fluid distributor having high pressure chamber and low pressure chamber and means causing the high pressure fluid of the high pressure chamber to be effective upon one side of a piston and the low upon the other side during a normal period and whereby the fluid distributor causes reversal of the fluid pressures upon the piston sides during a fluid releasing period and means whereby the fluid is released to a related cylinder chamber during the fluid releasing period.

3. In an internal combustion engine, cylinders and cooperating pistons, a valve piston in a valve casing related to each cylinder, a fluid distributor having high pressure chamber and low pressure chamber and means causing the high pressure fluid of the high pressure chamber to be effective upon one side of a valve piston and the low upon the other side of the valve piston during a normal period and whereby the fluid distributor causes reversal of the fluid pressures upon the valve piston sides during a fluid releasing period and means whereby the fluid is released to a related cylinder chamber during the fluid releasing period.

4. In an internal combustion engine, an engine cylinder and cooperating piston, a valve piston reciprocable in a valve casing, a source of fluid fuel under high pressure, in combination with means timed in relation to the operation of the cooperating piston whereby the high pressure fluid fuel is periodically applied on one side of the valve piston and at alternative periods on the other side of the valve piston, and means whereby at each period when the high pressure fluid fuel is applied on a particular side of the valve piston, fluid fuel will be released to the engine cylinder.

5. In an internal combustion engine, an engine cylinder and a cooperating piston, a valve piston reciprocable in a valve casing, a source of fluid fuel under high pressure, in combination with means timed in relation with the operation of the cooperating piston whereby periodically high pressure fluid fuel is applied on one side of the valve piston and at alternative periods on the other side of the valve piston, a valve actuated by the valve piston and controlling a port of communication with the engine cylinder whereby at each period when the high pressure fluid fuel is applied on a particular side of the valve piston, fuel from the high pressure fluid fuel source will be released to the engine cylinder.

6. In an engine, an engine combustion chamber and a cooperating motor element, a valve piston reciprocable in a valve casing, a source of fluid fuel under high pressure, in combination with means timed in relation with the operation of the cycle of combustion whereby periodically the high pressure fluid fuel is applied on one side of the valve piston and at alternative periods on the other side of the valve piston, and means whereby at each period when the high pressure fluid fuel is applied on a particular side of the valve piston, fluid fuel will be released to the combustion chamber.

7. In an internal combustion engine, engine cylinders and cooperating pistons, a valve piston reciprocable in a valve casing related to each engine cylinder, a source of fluid fuel under high pressure, in combination with means timed in relation to the actuation of the cooperating pistons whereby the high pressure fluid fuel is periodically applied on one side of each valve piston in timed relation to the actuation of the related cooperating piston and at alternative periods on the other side of the respective valve piston, and means whereby at each period when the high pressure fuel is applied on a particular side of the valve piston, fuel is released to the related engine cylinder.

8. In an internal combustion engine, engine cylinders and cooperating pistons, a valve piston reciprocable in a valve casing related to each engine cylinder, a source of fluid fuel under high pressure in combination with means timed in relation to the actuation of the cooperating pistons whereby the high pressure fluid fuel is periodically applied on one side of each valve piston in timed relation to the actuation of the related cooperating piston, and at alternative periods on the other side of the respective valve piston and means whereby a valve is actuated by each valve piston and controlling a port of communication with the engine cylinder whereby at each period when high pressure fluid fuel is applied on a particular side of a valve piston, fluid fuel from the high pressure fluid fuel source will be released to an engine cylinder.

9. In an internal combuition engine, engine cylinders and cooperating pistons, a conduit system wherein fluid fuel is maintained at high pressure and a conduit system wherein fluid fuel is maintained at low pressure, in combination with a valve piston related to each cylinder controlling a related port of delivery to the engine cylinder whereby when the valve piston is moved by high pressure fluid fuel on a particular side fuel is released to the engine cylinder and means whereby the high pressure fluid and the low pressure fluid are effective on opposite sides of the valve piston of each cylinder and whereby there is periodic reversal of the fluid systems on the valve piston of each cylinder in timed relation to the actuation of the cooperating piston of the cylinder.

10. In an internal combustion engine, an engine cylinder and cooperating piston, a conduit system wherein fluid fuel is maintained at high pressure and a conduit system wherein fluid fuel is maintained at a lesser pressure in combination with a valve piston adapted to control a port of delivery from the space on one side of the valve piston to the engine cylinder and means whereby the high pressure fluid and the low pressure fluid fuel are effective on opposite sides of the valve piston and whereby there is periodic reversal of the fluid systems on the valve piston in timed relation to the actuation of the cooperating piston.

11. In an internal combustion engine, in combination, an engine cylinder and piston therein, said cylinder having a fuel inlet valve and a pressure actuated member connected thereto, a source of fluid fuel pressure, and means to operate said valve by reversal of said pressure on opposite sides of said member alternatively, said means including a rotary distributor adjustable axially to vary the periods of application of said pressure.

12. Engine cylinders and cooperatitng pistons, ports of fuel delivery one related to each cylinder, a fuel conduit wherein liquid fuel is maintained under high pressure and a fuel conduit wherein liquid fuel is maintained at a lesser pressure and a rotary distributor common to all the cylinders for reversing the communication of the high and low pressure conduits with each port of fuel delivery periodically in timed relation with the operation of the related cooperating piston.

13. Engine cylinders and cooperating pistons, ports of fuel delivery one related to each cylinder, a fuel conduit wherein liquid fuel is maintained under high pressure and a fuel conduit wherein liquid fuel is maintained at a lesser pressure, and a rotatable distributor common to a plurality of cylinders actuable in timed relation with the cooperating pistons and operating to periodically alternate the communication of the high and low pressure conduits with the ports of fuel delivery, the alternations occurring as to each port of fuel delivery in timed relation with the cooperating piston.

14. In an internal combustion engine, combustion chambers and a cooperating motor element, valve piston chambers each having a cooperating reciprocable valve piston, nozzles related one to each valve piston chamber and delivering to a related combustion chamber, a high pressure liquid fuel supply and a low pressure liquid fuel supply, a distributing means providing means connecting the high pressure liquid fuel supply with one side of each valve piston chamber and the low pressure liquid fuel supply with the other side of each valve piston chamber and providing means for periodically reversing the connections with each valve piston chamber in timed relation, and means whereby each valve piston during its reversal period permits emission of liquid fuel from the valve piston chamber through its nozzle to its related combustion chamber.

15. In an internal combustion engine, combustion chamber and a cooperating motor element, valve piston chambers each having a cooperating reciprocable valve piston, nozzles related one to each valve piston chamber and delivering to a related combustion chamber, a high pressure liquid fuel supply and a low pressure liquid fuel supply, a distributing means providing means connecting the high pressure liquid fuel supply with one side of each valve piston chamber and the low pressure liquid fuel supply with the other side of each valve piston chamber and providing means for periodically reversing the connections with each valve piston chamber in timed relation, and means whereby each valve piston during its reversal period permits emission of liquid fuel from the valve piston chamber through its nozzle to its related combustion chamber, and means whereby the relative length of the reversal period of each valve piston may be enlarged or diminished.

16. In an internal combustion engine, combustion chambers and cooperating pistons, valve piston chambers each having a cooperating reciprocable valve piston, nozzles related one to each valve piston chamber and delivering to a related combustion chamber, a high pressure liquid fuel supply and a low pressure liquid fuel supply, a distributing means providing means connecting the high pressure liquid fuel supply with one side of each valve piston chamber and the low pressure liquid fuel supply with the other side of each valve piston chamber and providing means for periodically reversing the connections with each valve piston chamber in timed relation, means whereby each valve piston during its reversal period permits emission of liquid fuel from the valve piston chamber through its nozzle to its related combustion chamber, and means whereby the relative length of the reversal period of each valve piston may be enlarged or diminished.

17. Means for operating a fuel injection valve of an internal combustion engine, comprising, in combination, a casing, a pressure responsive member movable in said casing and controlling the valve, two fuel conduits or passages opening into said casing respectively at opposite sides of said member, and means for supplying liquid fuel under pressure, said means being connected to said conduits and operating to effect cyclic pressure fluctuations in each of said conduits, with the fluctuations in any one direction in one conduit in spaced phase relation to those in the other conduit.

18. Means for operating in timed sequence a plurality of fuel injection valves of an internal combustion engine comprising, in combination, a plurality of valve casings, one communicating with each engine cylinder, pressure responsive members movable in said casings and operating the respective injection valves, a series of pairs of liquid fuel conduits or passages, the pairs opening into the respective valve casings at opposite sides of the pressure responsive members therein, a source of liquid fuel under high pressure, a rotary liquid fuel distributor communicating with said source and with all of said pairs of conduits and operating to effect cyclic pressure fluctuations in each of said conduits, with the fluctuations in any one direction in one conduit of each pair in spaced phase relation to those in the other conduit of each pair, and with the fluctuations in the respective pairs in timed sequence.

19. Means for operating a fuel injection valve of an internal combustion engine comprising, in combination, a valve cylinder communicating at one end with the injection valve passage, a piston reciprocable in said cylinder and carrying the valve for opening and closing said passage, a source of liquid fuel under pressure, a fuel conduit communicating with said cylinder at one side of said piston and adapted to supply liquid fuel to said cylinder for discharge through said passage when said valve is opened by the fuel pressure, a fuel conduit communicating with said cylinder at the other side of said piston, and means driven by the engine for connecting said source selectively to said conduits.

20. Means for operating a fuel injection valve of an internal combustion engine, comprising, in combination, a casing, a pressure responsive member in said casing and controlling the valve, a source of liquid fuel under pressure, two fuel conduits or passages communicating respectively with said casing at opposite sides of said member, and means driven by the engine for periodically connecting said source to one of said conduits and also disconnecting said source from the other of said conduits, and at alternate periods connecting said source to said other conduit and also disconnecting said source from said one conduit.

21. Means for operating, and feeding liquid fuel through, the injection piston valve of a Diesel engine solely by fuel pressure thereon, comprising means for maintaining the liquid fuel under high pressure on one side of the piston and under lower pressure on the opposite side of the piston to hold the valve closed, and means driven by the engine for reversing said fuel pressures to opposite sides of the piston to open the valve and inject said fuel under the high pressure during the injection period of the engine.

22. Means for operating the fuel admission valves of multiple cylinder Diesel engines comprising a source of fluid fuel pressure, a piston carrying a valve for each engine cylinder respectively, a valve cylinder enclosing each of said pistons, alternately high and low pressure pipes communicating from said source to each of said valve cylinders, opening into the latter on opposite sides of each piston, and means driven by the engine for alternately reversing the said pressures in said pipes and on said sides of the pistons respectively and in succession according to the firing order of the engine cylinders.

23. Means for operating a fuel injection valve of an internal combustion engine comprising, in combination, a casing, a pressure responsive member in said casing and operating the valve, a source of liquid fuel under pressure, two fuel conduits connected to said casing at opposite sides of said member, and a rotary liquid fuel distributor driven by the engine for connecting said source periodically to one of said conduits and at alternate periods to the other of said conduits, said distributor being adjustable to vary the relative length of said alternate periods.

24. An internal combustion engine having, in combination, combustion chambers and cooperating motor elements, said chambers having fuel inlet passages, fuel inlet valves controlling the respective fuel inlet passages, valve-control casings communicating with the respective fuel inlet passages, pressure responsive members in said casings connected to the respective valves for opening and closing the latter, a source of liquid fuel under high pressure, means arranged to be placed in communication with said source and with the respective valve-control casings at opposite sides of said pressure responsive members for operating the latter and thereby opening and closing said valves to permit the liquid fuel to pass from said casings to the engine cylinders, distributing means communicating with said source of liquid fuel pressure and common to a plurality of engine cylinders, said distributing means being actuated in timed relation to the firing order of the respective combustion chambers and operating to effect cyclic pressure fluctuations through said first-mentioned means on opposite sides of said pressure responsive members to control in timed sequence the opening and closing of said fuel inlet valves, the said distributing means being constructed for adjustment independently of its actuated relation to the engine to vary the length of time which said fuel inlet valves remain in their open position.

25. An internal combustion engine having, in combination, combustion chambers and cooperating motor elements, said chambers having fuel inlet passages, fuel inlet valves controlling the respective fuel inlet passages, valve-control casings communicating with the respective fuel inlet passages, pressure responsive members in said casings connected to the respective valves for opening and closing the latter, a source of liquid fuel under high pressure, means arranged to be placed in communication with said source and with the respective valve-control casings at opposite sides of said pressure responsive members for operating the latter and thereby opening and closing said valves to permit the liquid fuel to pass from said casings to the engine cylinders, distributing means comprising a casing communicating with said source of liquid fuel pressure and common to a plurality of engine cylinders, said distributing means comprising a rotary control element continuously driven in timed relation to the firing order of the respective combustion chambers and operating to effect cyclic pressure fluctuations through said first-mentioned means on opposite sides of said pressure responsive members to control in timed sequence the opening and closing of said fuel inlet valves, the said rotary control element of said distributing means being shiftable axially relative to its casing to vary the length of time which said fuel inlet valves remain in their open position.

26. In an internal combustion engine, in combination, an engine cylinder and piston therein, said cylinder having a fuel inlet valve and a pressure actuated member connected thereto, a source of fluid fuel pressure, and means to operate said valve by reversal of said pressure on opposite sides of said member alternatively, said means including a rotary distributor having a casing with a rotor therein, said casing and rotor having coacting fuel passages which are controlled, first, by rotation of said rotor to effect said reversal of pressure and, second, by relative axial movement of said casing and said rotor to vary the duration of such reversal periods.

ADOLPHE C. PETERSON.